Patented Oct. 1, 1935

2,015,739

UNITED STATES PATENT OFFICE 2,015,739

WAX COATING COMPOSITION

Carl Winning, Elizabeth, N. J., assignor to Standard Oil Development Company, a corporation of Delaware No Drawing. Application August 29, 1933, Serial No. 687,313

4 Claims. (Cl. 134—1)

This invention relates to improvements in wax coating compositions, particularly those that produce a smooth non-sticky surface when used in coating plants, such as shrubs, and trees which are about to be stored, transplanted, pruned or otherwise operated upon.

Various wax coating compositions have been used to protect plants against rot, mold, drying out, where the plants have been removed from the ground, and to stimulate growth upon replanting by reducing transpiration. For example, wax dissolved in volatile solvents has heretofore been used, but after applying such a material, the solvent must be allowed to evaporate and as a result a fire hazard exists. Also, wax dissolved in highly refined heavy lubricating petroleum oil has been used. In this case, however, the oil generally seeps to the surface, and the result is that an oily coating is found as a layer on the outside. Wax, at an elevated temperature and in a molten state, has likewise been applied to trees and shrubs, but on cooling it becomes brittle, cracks, and is easily chipped off. Furthermore, wax mixed with sticky resinous substances or beeswax have been used and were found to have good adhesive power, but these do not yield a smooth non-sticky surface which is highly desirable for this type of work.

An object of this invention is to produce a smooth, non-tacky coating composition which possesses good flexibility and a relatively high melting point.

According to this invention, crude petrolatum which generally contains asphalt or a refined petrolatum to which a thickening agent such as asphalt, aluminum stearate, rubber, or cellulose trilaurate has been added, is incorporated with paraffin wax to form a coating composition which possesses the desired properties. Asphalt and other viscosity-increasing bodies will hereafter be known as "thickeners". The term "petrolatum" is herein employed to describe mixtures of petrolatum wax and oil substantially free of asphalt or other thickening agent.

The following formulas illustrate the various coating compositions that have been prepared according to this invention and found to answer the requirements of a non-sticky, plastic material possessing good flexibility and a relatively high melting point.

| Constituents | | | Properties of blend | |
|---|---|---|---|---|
| Paraffin wax [1] | Blending agents | | Penetration (50 grs. at 77° F.) | Melting point |
| | | | | Degrees Fahrenheit |
| 70% white scale | 20% crude petrolatum | 10% rosin | 70 | 121.0 |
| 70% refined | 20% crude petrolatum | 10% rosin | 47 | |
| 80% refined | 20% crude petrolatum | | 43 | |
| 70% refined | 30% crude petrolatum | | 54 | |
| 70% refined | 20% crude petrolatum | 10% oil-free petrolatum wax | 47 | 129.5 |
| 70% crude scale (140° F. M. P.) | 30% crude petrolatum | | 27 | 138.0 |
| 90% crude scale | 10% crude petrolatum | | 70 | 121.5 |
| 80% crude scale | 10% crude petrolatum | 10% rosin | 54 | 120.5 |
| 80% crude scale | 10% crude petrolatum | 10% heavy lubricating oil | 53 | 120.5 |
| 70% refined | 10% crude petrolatum | 10% cylinder oil | 45 | 122.0 |
| 80% crude scale | 10% crude petrolatum | 10% oil-free petrolatum | 55 | 128.5 |
| 80% crude scale | 10% crude petrolatum | 10% beeswax | 54 | 123.0 |
| 80% crude scale | 10% crude petrolatum | 10% mahogany sulfonates | 56 | 122.5 |
| 80% refined | 10% crude petrolatum | 10% oil-free paraffin wax | 36 | |
| 75% refined | 10% snow white petrolatum | 5% aluminum stearate | 69 | |
| 75% refined | 10% snow white petrolatum | 5% polymerized unsaturated hydrocarbons. | 72 | |
| 75% refined | | 5% rubber | 48 | |
| 75% refined | 10% snow white petrolatum | 5% cellulose trilaurate | 56 | |
| 80% refined | 10% snow white petrolatum | 10% 160° F. M. Pt. steam reduced asphalt. | 32 | |

[1] Unless otherwise noted, the wax has a melting point of 122° F.

The above wax coating compositions have good to excellent flexibility. The flexibility was determined by coating pieces of a rubber gasket ½ inch x 2½ inches x ⅛ inch with flexible collodion, and after this had dried, dipping them into the coating material maintained at 160° F. They were immediately removed, allowed to cool to room temperature for one-half hour and immersed in ice water (at 32° to 35° F.) for one hour. When removed, they were at once flexed by bending them about bottles of successively decreasing diameter. A poor coating will spall off in large flakes when bent around an 8 inch diameter bottle; a very good coating will scarcely crack when bent around a 1½ inch diameter bottle and the crack will disappear when the strip is unflexed.

The coating composition is applied to plants in the following manner: A tank open at the top is filled almost to the top with the coating composition. Heat is applied to melt the coating composition and to maintain a temperature in the neighborhood of 170°, but not substantially over 175° F. The plants are then taken by the roots and the tops dipped quickly in the molten coating composition and withdrawn. Care is taken to maintain the temperature below about 175° F. Lower temperatures than 170° F. form a heavier coating of the coating composition, which is not desirable as it does not protect the plants any better, and also is likely to crack and flake off, thus partly destroying the effectiveness. It is necessary to do the dipping quickly for best results. Care must be taken not to allow the roots to be coated.

This coating composition is found to be very suitable for coating plants but is not limited to that particular use. It is also suitable for water proofing materials such as shower bath curtains, tarpaulins, rope, raincoats, masonry; also for rustproofing pipe, plates, machinery, munitions; preserving rubber tires, poles, piles, wood structures and ships; and for protecting foodstuffs such as fruits, vegetables, cheese, etc.

The foregoing description is merely illustrative and alternative compositions may be made within the scope of the appended claims in which it is my intention to claim all novelty as broadly as the prior art permits.

I claim:

1. A non-tacky wax coating composition possessing flexibility and having a melting point above 115° F., comprising 70 to 90% of crystalline paraffin wax having a melting point higher than 115° F. and 10 to 30% of crude petrolatum containing a small percentage of asphalt.

2. A non-tacky wax coating composition possessing flexibility and having a melting point above 115° F., comprising 70 to 90% of crystalline paraffin wax having a melting point higher than 115° F., 10 to 30% of petrolatum and 10% of asphalt having a melting point of about 160° F.

3. A non-tacky wax coating composition possessing flexibility and having a melting point above 115° F., comprising 70 to 90% of crystalline paraffin wax having a melting point higher than 115° F., 10 to 30% of petrolatum containing a small amount of asphalt in solution and 10% of rosin.

4. A non-tacky wax coating composition possessing flexibility and having a melting point above 115° F., comprising 70 to 90% of crystalline paraffin wax having a melting point above 115° F., 10 to 30% of petrolatum and 0.1 to 10% of a thickening material.

CARL WINNING.